March 12, 1968     C. L. CAMPBELL     3,372,532

DRY SEPARATOR

Filed Aug. 17, 1965

INVENTOR.
CHARLES LANGDON CAMPBELL
BY
ATTORNEY

United States Patent Office 3,372,532
Patented Mar. 12, 1968

3,372,532
DRY SEPARATOR
Charles Langdon Campbell, Houston, Tex., assignor to Centrifix Corporation, Houston, Tex., a corporation of Ohio
Filed Aug. 17, 1965, Ser. No. 480,382
1 Claim. (Cl. 55—394)

This invention relates to the art of separation of entrained substances from a carrier fluid, and more particularly relates to a dry separator construction by which particles such as fly ash, polyvinyl compositions, cement dust, ground or powdered fertilizer, salts, aluminum and aluminum compounds, of a minute order in size and weight may be effectively and economically separated from the carrier fluid with a high degree of efficiency.

It is an object of this invention to provide a dry separator which will function efficiently and which may be operated continuously to effectively separate, by centrifugal action, particulate matter from a substantially dry entraining fluid or gas passing through the separator.

Another object is to prevent re-entrainment of the particulate matter with the carrier fluid or gas during its course of travel through the separator.

A further object is to effectively and efficiently remove dry particulate matter of an order from 1 to approximately 5 microns and having a specific gravity of .1 to 1.5 together with relatively coarser particles from an entraining fluid carrier at controlled velocities.

Still another object is a dry separator of the character disclosed by which simple fabrication methods may be employed and which is extremely compact in construction, is possessed of no moving parts, and which is characterized by an extremely low pressure drop in the flow path.

Another object is to employ a suction source close to, adjacent and in direct communication with the fluid outlet of the apparatus.

Other and further objects and advantages of the present invention will be apparent from the following description and claims, reference being made to the accompanying drawing which shows a preferred embodiment of the present invention and the principles thereof, and what is now considered to be the best mode in which to apply these principles. Other embodiments of the invention employing equivalent principles may be applied by those skilled in the art, and structural changes may be made as desired without departing from the scope of the present invention.

Figure 2:
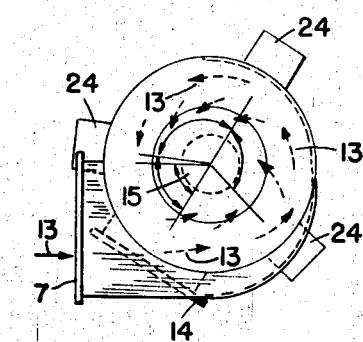
FIGURE 2 is a top plan view of the device shown in FIGURE 1.
Figure 1:
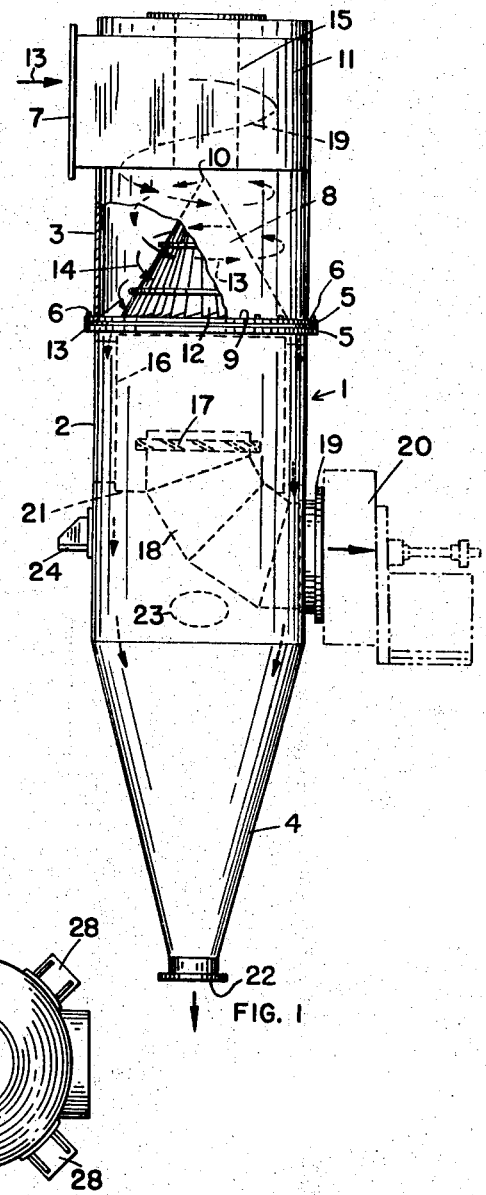
FIGURE 1 is a side elevation, partly in section, showing one embodiment of the invention in which the particle laden carrier enters the upper portion of the separator in a tangential direction with respect to the vertically disposed outer shell or body of the separator.

In carrying out my invention as illustrated in the drawings and referring more particularly first to FIGURES 1 and 2 which illustrate one embodiment of the invention, the dry separator shown includes a substantially vertically disposed shell or receiver shown generally at 1 and which consists of an intermediate cylindrical portion or chamber 2, and an upper receiving chamber 3, and which terminates at its lower end in a discharge hopper 4. The chambers 2 and 3 are each provided with an annular outwardly extending flange, as at 5, which overlie one another when the chambers are assembled and by which the chambers are bolted and secured together in axial alignment as at 6. The hopper portion 4 may be permanently welded to the lower edge of the chamber 2.

In this form of the invention, the carrier fluid laden with particulate matter in which minute particles are present, as for instance, fly ash, polyvinyl compositions, cement dust, ground or powdered fertilizer, salts, aluminum and aluminum compounds, is introduced and drawn into the receiving chamber 3 through an inlet opening 7 in a direction substantially tangentially of the chamber or casing wall 3, and is thus subjected to an initial centrifugal movement therein.

Supported in the receiver 3 by suitable means is a conical tuyere 8 having its base portion 9 located substantially in the plane of the flanges 5 but spaced peripherally from the receiver wall, and extending upwardly so that its apex portion 10 is located axially of the receiver 3 and just below the bottom wall of the tangential inlet casing 11. The tuyere blades 12 overlie one another in spaced relation around the periphery of the tuyere, tapering in width in the direction of the apex 10 and are disposed at an angle to the generally conical surface of the tuyere and angularly inwardly of the tuyere axis in a direction compatible with the direction of intake flow through the tangential inlet casing 11, as clearly indicated in FIGURES 1 and 2. In these figures, I have indicated the direction of flow of the laden fluid from the inlet opening 7 into the receiver 3 and around and between the respective tuyere blades 12, by means of the arrows 13. Thus the initial centrifugal forces imparted to the inlet flow or stream in the casing 11 increase progressively as the fluid and the entrained particles pass in a helical path downwardly toward the base of the tuyere and along and between the tuyere blades, as indicated by the arrows 14.

A spool 15 is supported in the upper closed end of the inlet casing 11 and extends in axial alignment with and downwardly to a point just above the apex 10 of the tuyere. The inflow of laden fluid is thus caused to take a path around this spool and is drawn downwardly over and into the tuyere. The tuyere is supported at its base at spaced intervals within the receiver 3.

A cylinder 16, spaced peripherally from and supported within the chamber 2 is secured to the vortex breaker comprising an annular series of whirl blades 17 attached to the outlet conduit 18 adjacent the mouth thereof and terminating short of the inner surface of the cylinder 16 and within the space encompassed by the cylinder 16. A suitable coupling 19 connects the suction type blower 20 with the conduit 18. A supporting wall 21 connects the cylinder 16 with the conduit 18.

At 22 is provided an outlet for the separated particulate matter and which outlet may have a gate (not shown) or may be coupled with any depository desired. A clean-out opening is shown at 23. Brackets 24 enable the unit to be mounted in a vertical position in use.

In this form of the invention, the laden fluid entering the unit at 13 is subjected to an initial and progressively increasing rate of centrifugal force as it passes around the spool 15, and directed downwardly in a helical direction, as illustrated by the arrows 13 and 14. This flow being increasingly confined as it approaches the tuyere base accelerates, passing between the blades 12 and thence downwardly along the cylinder 16 and the inner wall of the cylinder 2, causing the particulate matter to be separated from the entraining fluid and to pass into the hopper 4. I provide the vortex breaker 17 for preventing re-entrainment of particles in the fluid stream.

Since the suction blower 20 is the means by which the laden fluid is drawn into the unit where it is subjected to a centrifugal downward movement at progressively accelerated rates, the particulate matter will readily be separated out of the fluid and deposited in the hopper while the unladen fluid is exhausted from the blower to the atmosphere.

Figure 3:
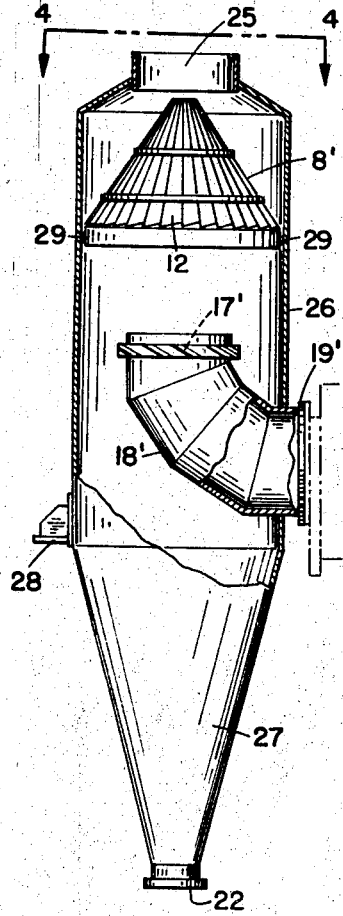
FIGURE 3 illustrates a modified form of the invention partly in elevation and partly in section in which the particle laden fluid enters the separator in a substantially axial direction with respect to the shell or body.
Figure 4:
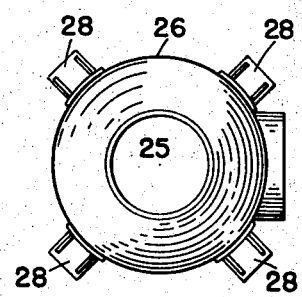
FIGURE 4 is a top end view of the form shown in FIGURE 3 and is taken in the direction of the arrows 4—4 of FIGURE 3.

In FIGURES 3 and 4, I have illustrated a modified form of the invention wherein the tuyere 8' is spaced peripherally from and supported in the outer casing 26, as at 29, thus allowing the separated particulate matter to travel downwardly along the internal wall of the casing 26 to the hopper 27. Like the device shown in FIGURES 1 and 2, the direction of movement of the flow is essentially a down flow.

In FIGURES 3 and 4, the laden fluid is drawn into the separater through the inlet 25 under the suction forces generated by the suction blower 20' and through the outlet conduit 18' and the coupling 19'. As in FIGURES 1 and 2, the vortex breaker 17' serves to prevent re-entrainment of separated particulate matter in the fluid stream.

It is to be understood from the foregoing description and accompanying drawing that the dry separator of the present invention is not to be regarded as limited by the above described embodiment. It will be apparent therefore to those skilled in the art that other alternative arrangements of parts, substitution of materials and other organization and assembly procedures may be employed without departing from the scope and spirit of the invention claimed.

I claim:

1. A vertical downflow dry centrifugal separator comprising an upper cylindrical chamber receiving a particulate laden carrier fluid, a carrier fluid inlet passage in the side wall of said upper chamber and tangential to the cylindrical wall of said upper chamber and imparting an initial whirling movement to the laden fluid passing through said inlet and into said upper chamber, said chamber being closed at its top end, a spool depending into said upper chamber from said closed top end and coaxial with said upper chamber, a bladed generally conical tuyere having whirl-inducing louvres, each inclined with respect to the generally conical surface of said tuyere and supported in said upper chamber below said spool and spaced apart from the walls of the upper chamber with its apex portion adjacent and below said inlet for imparting a whirling movement to the laden fluid entering the chamber from the inlet and passing through the bladed tuyere, the base portion of the tuyere being disposed below the tuyere apex, an annular outwardly and laterally extending flange on the lower end of said upper chamber, and a cylindrical intermediate chamber having the same diameter as said upper chamber and having an annular outwardly and laterally extending flange formed on the upper end thereof, support means supporting the base of said tuyere within and at the lower end of said upper chamber, means securing said flanges together, said intermediate chamber being in communication with the upper chamber through said tuyere, a lower discharge hopper sealingly connected at all points of its upper periphery to the lower periphery of said intermediate chamber and having downwardly converging walls substantially throughout its length and in communication at its upper end with said intermediate chamber and receiving and discharging particulate matter separated from the carrier fluid and terminating at its lower end in a discharge opening, said upper and intermediate chambers, said tuyere, said hopper, said discharge opening and said spool all being arranged in vertical axial alignment, a cylinder supported coaxial with and within said intermediate chamber having its upper end spaced vertically below the base of said tuyere and spaced throughout its length from the interior surface of the wall of the intermediate chamber and providing an annular passage between the outer surface of said cylinder and the inner wall of said intermediate chamber which receives and directs particulate matter separated from the carrier fluid in passing through said tuyere to said discharge hopper, a substantially right angle elbow outlet conduit in the intermediate chamber receiving the unladen carrier fluid passing from the base of the tuyere into the last named chamber, the upper inlet portion of said conduit being in vertical axial alignment with and spaced below the base of the tuyere and above the lower end of said cylinder with the conduit outlet portion extending through a side wall of the said intermediate chamber, an annular series of vortex breaking whirl blades on the exterior surface of said outlet conduit adjacent the said inlet portion thereof and extending outwardly and toward said cylinder, said blades terminating short of the side walls of the cylinder and encompassed therewithin, and means operatively connected to said separator for imparting movement to the carrier fluid through said separator.

References Cited

UNITED STATES PATENTS

| | | | |
|---|---|---|---|
| 1,700,261 | 1/1929 | Hawley | 55—398 X |
| 1,725,712 | 8/1929 | Hawley | 55—455 X |
| 1,960,887 | 5/1934 | Alexander | 55—459 X |
| 2,059,522 | 11/1936 | Hawley | 55—459 X |
| 2,093,257 | 9/1937 | Thorsen. | |
| 2,216,389 | 10/1940 | Hawley | 55—450 X |
| 2,565,902 | 8/1951 | Wright et al. | 55—424 |
| 2,645,346 | 7/1953 | Staege et al. | 209—211 |
| 2,709,501 | 5/1955 | Toth et al. | 55—442 X |
| 2,779,724 | 1/1957 | Dunning et al. | 55—447 X |
| 2,925,884 | 2/1960 | Campbell | 55—455 X |
| 2,952,330 | 9/1960 | Winslow | 55—459 X |

OTHER REFERENCES

Line Separators, Bulletin A-100, Centrifix Corporation, 1017 Le Hall, Houston, Tex., 77025, copyright 1963, 4 pages.

FRANK W. LUTTER, *Primary Examiner.*

HARRY B. THORNTON, *Examiner.*

D. TALBERT, *Assistant Examiner.*